United States Patent
Jayaram et al.

(10) Patent No.: US 6,996,589 B1
(45) Date of Patent: Feb. 7, 2006

(54) SYSTEM AND METHOD FOR DATABASE CONVERSION

(75) Inventors: Nandagopal Mysore Jayaram, Cincinnati, OH (US); Philip Jay Hudson, Alexandria, KY (US); Sadu Shetty, Cincinnati, OH (US); Atul Chintaman Paradkar, Cincinnati, OH (US)

(73) Assignee: Convergys CMG Utah, Inc., Cincinnati, OH (US)

( * ) Notice: Subject to any disclaimer, the term of this patent is extended or adjusted under 35 U.S.C. 154(b) by 417 days.

(21) Appl. No.: 10/050,273

(22) Filed: Jan. 16, 2002

(51) Int. Cl.
  *G06F 17/30* (2006.01)
(52) U.S. Cl. ............... 707/204; 707/200; 707/100; 707/202; 707/4
(58) Field of Classification Search ........ 707/204, 707/200, 100, 202, 4, 10, 205, 101
  See application file for complete search history.

(56) References Cited

U.S. PATENT DOCUMENTS

| | | | |
|---|---|---|---|
| 5,732,257 A | 3/1998 | Atkinson et al. | |
| 5,930,806 A | 7/1999 | Taira et al. | |
| 5,970,490 A | 10/1999 | Morgenstern | |
| 6,151,608 A * | 11/2000 | Abrams ................ | 707/204 |

FOREIGN PATENT DOCUMENTS

JP    5346965 A2    4/1978

OTHER PUBLICATIONS

Data Junction, Inc.—Data Conversions, Data Transformations, Software—Frequently Asked Questions (5 pgs); http://www.datajunction.com/products.asp?NavID-132; Aug. 22, 2001.
ETI—Products (1 pg); http://www.eti.com/products/ext_whatitdoes.htm; Aug. 22, 2001.
ETI—Products—ETI Extract Tool Suite Components (1 pg); http://www.eti.com/products/ext_howitworks.htm; Aug. 22, 2001.

(Continued)

*Primary Examiner*—Charles Rones
*Assistant Examiner*—Belix M. Ortiz
(74) *Attorney, Agent, or Firm*—Frost Brown Todd LLC

(57) ABSTRACT

A database conversion engine comprising a method and system to convert business information residing on one system to another system. A generic, extensible, scalable conversion engine may perform conversion of source data to target data as per mapping instructions/specifications, target schema specifications, and a source extract format specification without the need for code changes to the engine itself for subsequent conversions. A scheduler component may implement a scalable architecture capable of voluminous data crunching operations. Multi-level validation of the incoming source, data may also be provided by the system. A mechanism may provide data feeds to third-party systems as a part of business data conversion. An English-like, XML-based (extensible markup language), user-friendly, extensible data markup language may be further provided to specify the mapping instructions directly or via a GUI (graphical user interface). The system and method employs a business-centric approach to data conversion that determines the basic business object that is the building block of a given conversion. This approach facilitates identification of basic minimum required data for conversion leading to efficiencies in volume of data, performance, validations, reusability, and conversion turnover time.

13 Claims, 9 Drawing Sheets

OTHER PUBLICATIONS

ETI—Products ETI Extract Transforms Complex Data Values (2 pgs); http://www.eti.com/products/ext_transdata.htm; Aug. 22, 2001.

Mercator Integration Broker—Model-Driven Solutions for Intelligent Business Integration; Sep., 2001.

SAP Data Migration Services (5 pgs); http://www.kinexisdms.com/SAP.htm; Oct. 9, 2001.

Campagne Associates—Conversion Procedures (6 pgs); http://www.campagne.com/dc_info.html; Oct. 9, 2001.

SAP Labs—Data Transfer Work Bench; http://wwwtech.saplabs.com/datatransfer/dxtool01.asp; Oct. 16, 2001.

Notesnet: Exercising XML with Domino Designer (15 pgs); httm://www.notes.net/today.nsf/8a6d147cf55a7fd385256658007 aacfl/71d6bfle2d6bbfe7852 . . . ; Jan. 3, 2002.

XML (2 pgs); http://www.lotus.com/developers/devbase.nsf/homedata/xml; Jan. 3, 2002.

XML Enters the DBMS Arena (7 pgs); http://www.computerworld.com/cwi/story/0,1199,NAV47-68-85-1552_STO53026,00.html; Jan. 3, 2002.

Lotus Advisor Magaine: Lotus Increases XML Integration (3 pgs); http://www.advisor.com/Articles.nsf/ID/MLN0004.PEPUG10; Jan. 3, 2002.

Database- a search Database definition, 8 pgs); http://searchdatabase.techtarget.com/sDefinition/0,,sid13_gci211895,00.html; Jan. 7, 2002.

Data integration solutions, XML and metadata transformation (1 pg); http://www.datajunction.com/; Jan. 7, 2002.

Link Collection for Databases/Mapping (2 pgs); http://www.mgm-edv.de/ejbsig/bm_db.html; Aug. 22, 2001.

Data Modeling—a search Database definition (2 pgs); http://searchdatabase.techtarget.com/sDefinition/0,,sid13_gci211902,00.html; Aug. 22, 2001.

Secant Technolgies—Database Mapping FAQ's (10 pgs); http://www.secant.com/developers/faq_database.html; Aug. 22, 2001.

Mapping Object to Relational Databases, an AmbySoft Inc. White Paper, by Scott W. Ambler (4 pgs); http://www.ambysoft.com/mappingObjects.html; Aug. 22, 2001.

Developer Works: Components: Mapping objects to relational databases (9 pgs); http://www-106.ibm.com/developerworks/library/mapping-to-rdb/; Aug. 22, 2001.

Data Junction, Inc.—Data Conversions, Data Transformations, Software—Products (4 pgs); http://www.datajunction.com/products.asp; Aug. 22, 2001.

Data Junction, Inc.—Data Conversions, Data Transformations, Software—Integration Engine Technical Overview (6 pgs); http://www.datajunction.com/products.asp?NavID-174; Aug. 22, 2001.

Data Junction, Inc.—Data Conversions, Data Transformations, Software—Data Junction Integration Studio (2 pgs); http://www.datajunction.com/products.asp?NavID-75; Aug. 22, 2001.

* cited by examiner

Data Conversion Overview 200

SYSTEM AND METHOD FOR DATABASE CONVERSION

TECHNICAL FIELD

The invention relates to a data/database conversion engine, and more particularly to a generic database conversion engine and methodology for a bulk conversion of data from a source database to a target database.

BACKGROUND ART

Data conversion is useful to convert business information from an existing system to another system. The underlying business reasons for the conversion of information range from consolidation of an industry (such as the telecommunications industry) to seeking an upgrade of an information system to gain access to superlative business functionality.

In a typical data conversion project, the first task is mapping the information/ functionality from the source system to the target system. For example, a conversion involving a social security number may comprise a straight mapping, manipulated mapping, and bridge mapping. Straight mapping applies to data that is stored in the target system the same way as it is in the source system. In manipulated mapping, a customer's name may be a one field [whole name] to three field [first name, middle name, and last name] conversion. The data mapping has to split the customer name from the source system into three pieces and put it into three distinct fields in the target system. Other data conversions may require bridging functionality that does not exist in the source system. This requires relatively complex processing where information has to be derived from a combination of other existing sources.

Third party vendors generally perform data conversions from one client's system to another. It is estimated that corporations spend billions of dollars to fund projects to write custom code for converting data from a source system to a target system. Such custom code is generally restricted to a particular conversion and becomes a choice that provides a low return on investment from a re-use perspective. Please see, http://www.campagne.com/dc_info.html and http://www.kinexisdms.com/SAP.htm. Prior art database conversion engines are also customized to the current job and are not reusable without significant rewriting of the code employed on such systems. Therefore, there are no cost-effective tools currently in the market that are built for one-time data conversion needs.

Third party data conversion tools traditionally dump data with no logical relationships. Such dumping often results in a significant percentage of errors, which may or may not be discovered before the system goes live. Alternatively, some tools (see, U.S. Pat. No. 6,151,608 issued Oct. 19, 1999, to Morgenstern; DataJunction, http://www.datajunction.com; and Evolutionary Technologies International) are appended to a source system to provide customized, real-time, data conversion into the target system but these do not provide generic, one-time, bulk data conversion solutions. Other prior art systems provide engines for migrating data from one specific database to another specific database (i.e., relational database to relational database as per U.S. Pat. No. 6,151,608 (issued Nov. 21, 2000, to Abrams); network database to relational database as per U.S. Pat. No. 5,930,806 (issued Jul. 27, 1999, to Taira); and relational database to object-oriented database as per U.S. Pat. No. 5,732,257 (issued Mar. 24, 1998, to Atkinson). None of these engines, however, provide a generic solution for effecting the conversion of any combination of source and target databases. These engines are also geared toward real-time translation rather than one-time conversions. Some of the prior art systems, discussed above, further provide inflexible mapping templates for effecting the conversion rather than configurable rules to broadly address any type of conversion needed.

Bulk conversions and/or one-time solutions for generic data conversions present significantly different performance and cost issues than real-time customized solutions. Therefore, the prior art does not provide a system and method, which effectively answers these needs.

SUMMARY OF THE INVENTION

There is a need for a resilient, scalable, and customizable database conversion solution. Embodiments of the invention may be put to use when information from one system (source) is converted into another system (target), which may provide a better set of business features/functions. There is further a need to provide a system and method for flexibly incorporating newer database tables identified for conversion; flexibly addressing special data translation needs of the customer; scaling the system to improve performance; and flexibly modifying the source extract format specification to incorporate special/uncommon information/data relevant in the source system.

In information technology, conversions/translations/migrations include the process of moving from the use of one operating environment to another operating environment that is, in most cases, thought to be a better one. Migration can involve moving to new hardware, new software, or both. Migration can be small-scale, such as migrating a single system, or large-scale, involving many systems, new applications, or a redesigned network. One can migrate data from one kind of database to another kind of database (see, http://searchsystemsmanagement.techtarget.com/sDefinition/0,,sid20_gci214624, 00.html)

A database conversion engine may comprise a computer system encoded or served with computer-executable instructions for effecting conversions using a mapping specification, target schema specification, and, if necessary, a source extract format specification. A target schema specification comprises computer readable instructions regarding the layout of the target database. A mapping specification comprises computer readable instructions regarding the translations to take place in the conversion. The source extract format specification comprises computer readable instructions for ordering data in a source database into a file according to a basic business object determined by analyzing the source and target systems. The mapping specification, target schema specification, and possibly the source extract format specification are all designed around a basic business object, which comprises a definition of all of the information to be transferred from one system to another.

The database conversion engine may be configured/coded to handle input for any type of source database (possibly via the source extract format specification) and produce output for any type of target database (via the mapping specification and the target schema specification). Therefore, the database conversion engine can handle translations for any combination of source and target feeds including homogenous conversions, heterogenous conversions, distributed conversions; relational to object-oriented conversions, object-oriented to relational conversions, relational to relational conversions, objected-oriented to object- oriented conversions, and more. The database conversion engine is coded to be database non-specific so that the only database specific items necessary for a particular conversion are the mapping specification, target schema specification, and possibly the source extract format specification. The database conversion engine, itself, does not need to be reprogrammed for each conversion, rather, it is coded to manipulate the various input files and provides a method for converting databases that can be implemented without requiring actual programming or programming expertise. The mapping specification, target schema specification, and possibly the source extract format specification may be constructed using a GUI or simple instruction language that does not require programming expertise to manipulate. A compiler/linker may translate these instructions into computer-readable executable instructions.

A computer system is disclosed for migrating a source database to a target database comprising a set of mapping instructions; a target schema specification; and a database conversion engine. Data in the source database is sent to the database conversion engine. The target schema specification defines a set of requirements for the target database. The set of mapping instructions defines at least one translation instruction for the translation of the source data from the source database to the target database. The database conversion engine may receive or pull said source data, the set of mapping instructions and the target schema specification. The database conversion engine may parse the set of mapping instructions and the target schema specification. The database conversion engine may perform the set of mapping instructions on the source data. The database conversion engine may upload a resulting set of data into the target database in accordance with the target schema specification.

In one embodiment, a computer system is disclosed for migrating a source database to a target database comprising a set of mapping instructions; a target schema specification; and a generically coded database conversion engine wherein the database conversion engine is coded to perform conversions independent of the specific source database and target database associated with a conversion. Data in the source database may be sent to the database conversion engine. The target schema specification may define the target database. The set of mapping instructions may define at least one translation instruction for the translation of the source data from the source database to the target database. The database conversion engine may receive/pull said source data, the set of mapping instructions and the target schema specification. The database conversion engine may parse the set of mapping instructions and said target schema specification. The database conversion engine may perform the set of mapping instructions on the source data. The database conversion engine may upload a resulting set of data into the target database in accordance with the target schema specification.

In another embodiment, a computer system for migrating a source database to a target database may further include a delimited source file or a flat file, associated with the database, and a mapping language. In computer programming, a delimiter may be a character that identifies the beginning or the end of a character string (a contiguous sequence of characters). The delimiting character is generally not part of the character string. In command syntax, a space or a backslash ( ) or a forward slash (/) may often be used as a delimiter, depending on the rules of the command language. The program interpreting the character string knows what the delimiters are. Delimiters may also be used to separate the data items in a database (the columns in the database table) when transporting the database to another application. For example, a comma-separated values file is one in which each value, in the cells of a table row, is delimited by and separated from the next value by a comma. The beginning of a row may be indicated by a new line character. (see http://searchdatabase.techtarget.com/sDefinition/0,,sid13_gci211928,00.html) A set of data in the delimited source file or a flat file may be sent to a database conversion engine. A set of mapping instructions may be developed from the mapping language wherein the set of mapping instructions may define at least one translation instruction for the translation of the source data from the source database to the target database.

In another embodiment, a computer system for migrating a source database to a target database may, further or alternatively, include using the database conversion engine to validate said source data and to validate the resulting set of data in accordance with the target schema specification (validated resulting set of data).

In another embodiment, a computer system for migrating a source database to a target database may, further or alternatively, include a set of mapping instructions developed from a mapping language via a user interface. In an alternative embodiment the set of mapping instructions may be developed from an extensible mapping language via an interface wherein the set of mapping instructions may define at least one translation instruction for the translation of formatted source data from the source database to the target database. In yet another embodiment, the system may comprise an industry-specific mapping instructions template wherein the mapping instructions are developed from the industry-specific mapping instruction template. The mapping instruction template may comprise a telecommunications-specific or a billing-specific mapping instructions template.

In another embodiment a computer system for migrating a source database to a target database may include a database conversion engine that parses a set of mapping instructions and concurrently performs the set of mapping instructions on source data to produce a resulting set of data.

In another embodiment, a computer system for migrating a source database to a target database comprises a set of mapping instructions; a target schema specification; a delimited source file or flat file associated with the source database; a mapping language; an industry-specific mapping instructions template; a source extract format specification; and a generically coded database conversion engine wherein said database conversion engine is coded to perform conversions independent of the specific source database and target database associated with a conversion. A basic business object may be derived by analyzing the source database and the target database. A set of data in a delimited source file/flat file may be sent to a database conversion engine. The database conversion engine may validate the source data. The target schema specification may define the target database. A set of mapping instructions may be developed from the industry-specific mapping instruction template and the mapping instructions may be further configured using the mapping language via a graphical user interface wherein the set of mapping instructions may define at least one translation instruction for the translation of the formatted source data from the source database to the target database. The set of mapping instructions may define at least one translation instruction for the translation of the source data from the source database to the target database. The source extract format specification and the target schema specification may be configured according to the basic business object. The database conversion engine may receive the source data, the set of mapping instructions and the target schema specification. Data in the source database may be formatted according to the source extract format specification to produce a file with repetitive instances of the basic business object (formatted source data). The database conversion engine may parse the set of mapping instructions and the target schema specification. The database conversion engine may concurrently perform the set of mapping instructions on the source data. The database conversion engine may validate the resulting set of data in accordance with the target schema specification (validated resulting set of data). The database conversion engine may upload a validated resulting set of data into the target database in accordance with the target schema specification.

In another embodiment, a computer system for migrating a source database to a target database may comprise a set of mapping instructions; a source extract format specification; a target schema specification; and a generically coded database conversion engine wherein the database conversion engine is coded to perform conversions independent of the source database and target database associated with a conversion. A basic business object may be derived by analyzing information to be transferred from the source database to the target database. The source extract format specification and the target schema specification may be configured according to the basic business object. Data in the source database may be sent to the database conversion engine. The target schema specification may define the target database. The set of mapping instructions may define at least one translation instruction for the translation of the source data from the source database to the target database. Data in the source database may be formatted according to the source extract format specification to produce a file with repetitive instances of the basic business object (formatted source data). The database conversion engine may receive the formatted source data, the set of mapping instructions and the target schema specification. The database conversion engine may parse the set of mapping instructions and the target schema specification. The database conversion engine may perform the set of mapping instructions on the formatted source data. The database conversion engine may upload a resulting set of data into the target database in accordance with the target schema specification.

In another embodiment, a computer system for migrating a source database to a target database may comprise a mapping specification; a data filter; a source extract format specification; a target schema specification; and a generically coded database conversion engine wherein the database conversion engine is coded to perform conversions independent of the specific source database and target database associated with a conversion. The data filter may format the source data according to the source extract format specification (formatted source data). The data filter, computer-executable instructions on a computer readable medium served to or encoded on a computer, may or may not comprise a component of the database conversion engine. The database conversion engine may receive the formatted source data. The database conversion engine may convert the formatted source data according to the mapping specification (converted data). The database conversion engine may format the converted data in accordance with the target schema specification (target data). The database conversion engine may upload the target data into the target database.

A computer system is disclosed for migrating a source database to a target database. The computer system further or alternatively comprises a delimited source file or flat file associated with the source database; a set of mapping instructions; a mapping language; a target schema specification; and a generically coded database conversion engine. A set of data in the delimited source file/flat file is sent to a database conversion engine; the target schema specification defines a set of requirements for the target database; a set of mapping instructions is developed from the mapping language, wherein the set of mapping instructions defines at least one translation instruction for the translation of the source data from the source database to the target database. The database conversion engine receives the source data, the set of mapping instructions and the target schema specification. The database conversion engine parses the set of mapping instructions and performs the set of mapping instructions on the source data to produce a resulting set of data. The database conversion engine validates the resulting set of data in accordance with the target schema specification (validated resulting set of data). The database conversion engine uploads the validated resulting set of data into the target database.

A computer system disclosed for migrating a source database to a target database may also comprise a delimited source file or flat file associated with the source database; a set of mapping instructions; a mapping language; a target schema specification; and a generically coded database conversion engine. A set of data in the delimited source file/flat file may be sent to the database conversion engine. The target schema specification may define a set of requirements for the target database. A set of mapping instructions may be developed from the mapping language wherein the set of mapping instructions defines at least one translation instruction for the translation of the source data from the source database to the target database. The database conversion engine may receive the source data, the set of mapping instructions and the target schema specification. The database conversion engine may validate the source data. The database conversion engine may parse the set of mapping instructions and may perform the set of mapping instructions on the source data to produce a resulting set of data. The database conversion engine may validate the resulting set of data. The database conversion engine may upload the resulting set of data into the target database.

A computer system is disclosed for migrating a source database to a target database; the computer system may also comprise a delimited source file or flat file associated with the source database; a set of mapping instructions; a mapping language; a target schema specification; and a generically coded database conversion engine. A set of data in the delimited source file/flat file may be sent to the database conversion engine. The target schema specification may define a set of requirements for the target database. A set of mapping instructions may be developed from the mapping language via an interface wherein the set of mapping instructions may define at least one translation instruction for the translation of the source data from the source database to the target database. The database conversion engine may receive the source data, the set of mapping instructions and the target schema specification. The database conversion engine may validate the source data. The database conversion engine may parse the set of mapping instructions and may perform the set of mapping instructions on the source data to produce a resulting set of data. The database conversion engine may validate the resulting set of data. The database conversion engine may upload the resulting set of data into the target database.

A computer system for migrating a source database to a target database may also comprise a delimited source file or flat file associated with the source database; a set of mapping instructions; an extensible mapping language; a target schema specification; and a generically coded database conversion engine. A set of data in the delimited source file/flat file may be sent to the database conversion engine. The target schema specification may define a set of requirements for the target database. A set of mapping instructions may be developed from the extensible mapping language via an interface wherein the set of mapping instructions may define at least one translation instruction for the translation of the source data from the source database to the target database. The database conversion engine may receive the source data, the set of mapping instructions and the target schema specification. The database conversion engine may validate the source data. The database conversion engine may parse the set of mapping instructions and may perform the set of mapping instructions on the source data to produce a resulting set of data. The database conversion engine may validate the resulting set of data. The database conversion engine may upload the resulting set of data into the target database.

A computer system for migrating a source database to a target database may also comprise a delimited source file or flat file associated with the source database; a source extract format specification; a set of mapping instructions; an industry-specific mapping instructions template; a mapping language; a target schema specification; and a generically coded database conversion engine. A set of data in the delimited source file/flat file may be formatted according to the source extract format specification (thus producing formatted source data). The target schema specification may define a set of requirements for the target database. A set of mapping instructions may be developed from the industry-specific mapping instruction template and may be further configured using the mapping language via a graphical user interface wherein the set of mapping instructions may define at least one translation instruction for the translation of the formatted source data from the source database to the target database. The database conversion engine may receive the formatted source data, the set of mapping instructions and the target schema specification. The database conversion engine may validate the formatted source data. The database conversion engine may parse the set of mapping instructions and may perform the set of mapping instructions on the formatted source data to produce a resulting set of data. The database conversion engine may validate the resulting set of data. The database conversion engine may upload the resulting set of data into the target database.

A computer system for migrating a source database to a target database may also comprise a delimited source file or flat file associated with the source database; a source extract format specification; a set of mapping instructions; an industry-specific mapping instructions template; a mapping language; a target schema specification; and a generically coded database conversion engine. A set of data in the delimited source file/flat file may be formatted according to the source extract format specification (thus producing formatted source data). The target schema specification may define a set of requirements for the target database. A set of mapping instructions may be developed from the industry-specific mapping instruction template and may be further configured using the mapping language via a graphical user interface wherein the set of mapping instructions defines at least one translation instruction for the translation of the formatted source data from the source database to the target database. The database conversion engine may receive the formatted source data, the set of mapping instructions and the target schema specification. The database conversion engine may validate the formatted source data. The database conversion engine may parse the set of mapping instructions and may concurrently perform the set of mapping instructions on the formatted source data to produce a resulting set of data. The database conversion engine may validate the resulting set of data. The database conversion engine may upload the resulting set of data into the target database.

A computer system is disclosed for migrating a source database to a target database; the computer system comprises a source extract format specification; a set of mapping instructions; a target schema specification; and a generically coded database conversion engine. The source database and the target database may be analyzed to derive a basic business object. The source extract format specification and the target schema specification may be configured according to the basic business object. Data in the source database may be formatted according to the source extract format specification to produce a file with repetitive instances of the basic business object (formatted source data). The target schema specification may define a set of requirements for the target database. The set of mapping instructions may define at least one translation instruction for the translation of the formatted source data from the source database to the target database. The database conversion engine may receive the formatted source data, the set of mapping instructions and the target schema specification. The database conversion engine may parse the set of mapping instructions and may concurrently perform the set of mapping instructions on the formatted source data and may upload a resulting set of data into the target database.

A computerized method for migrating a source database to a target database may comprise the use of a delimited source file or flat file associated with the source database; a source extract format specification; a set of mapping instructions; an industry-specific mapping instructions template; a mapping language; a target schema specification; and a generically coded database conversion engine. The method may further comprise the steps of: formatting the delimited source file/flat file according to the source extract format (formatted source data); defining a set of requirements for the target database and encoding the requirements in the target schema specification; developing a set of mapping instructions, that define at least one translation instruction for the translation of the formatted source data from the source database to the target database, using the industry-specific mapping instruction template and further configuring the mapping instructions with commands developed with the mapping language via a graphical user interface; sending the formatted source data, the set of mapping instructions and the target schema specification to the database conversion engine; validating the formatted source data through a set of computer executable instructions encoded in the database conversion engine; parsing the set of mapping instructions; concurrently performing the set of mapping instructions on the formatted source data to produce a resulting set of data; validating the resulting set of data by comparing it to the target schema specification through a set of computer executable instructions encoded in the database conversion engine; and uploading the resulting set of data into the target database.

A computerized method for migrating a source database to a target database may also comprise the use of a source extract format/source extract format specification; a set of mapping instructions; a target schema specification; and a database conversion engine. The method may further comprise the steps of: defining at least one basic business object for the migration by analyzing the source database and the target database; configuring the source extract format and the target schema specification according to the basic business object; formatting data in the source database according to the source extract format to produce a file with repetitive instances of the at least one basic business object (formatted source data); defining a set of requirements for the target database in the target schema specification; defining a set of mapping instructions that define at least one translation instruction for the translation of the formatted source data from the source database to the target database; sending the formatted source data, the set of mapping instructions and the target schema specification to the database conversion engine; parsing the set of mapping instructions; concurrently performing the set of mapping instructions on the formatted source data using computer executable instructions encoded in the database conversion engine to create a resulting set of data; and uploading the resulting set of data into the target database.

A computerized method for migrating a source database to a target database is disclosed. The method may comprise utilizing a delimited source file or flat file associated with the source database; a source extract format specification; a set of mapping instructions; an industry-specific mapping instructions template; a mapping language; a target schema specification; and a generically coded database conversion engine. The database conversion engine may be coded to perform conversions independent of the specific source database and target database associated with a conversion. The method may further include formatting the delimited source file or a flat file according to the source extract format specification (formatted source data); defining a set of requirements for the target database and encoding the requirements in the target schema specification; developing a set of mapping instructions, that define at least one translation instruction for the translation of the formatted source data from the source database to the target database, by using the industry-specific mapping instruction template and further configuring the mapping instructions with commands developed with the mapping language via a graphical user interface; sending the formatted source data, the set of mapping instructions and the target schema specification to the database conversion engine; validating the formatted source data through a set of computer executable instructions encoded in the database conversion engine; parsing the set of mapping instructions; concurrently performing the set of mapping instructions on the formatted source data to produce a resulting set of data; validating the resulting set of data by comparing it to the target schema specification through a set of computer executable instructions encoded in the database conversion engine; and uploading the resulting set of data into the target database.

In another embodiment the computerized method for migrating a source database to a target database may further include the steps of defining at least one basic business object for the migration by analyzing the source database and the target database; configuring the source extract format specification and the target schema specification according to the basic business object; and formatting data in the source database according to the source extract format specification to produce a file with repetitive instances of the at least one basic business object (formatted source data).

BRIEF DESCRIPTION OF THE DRAWINGS

The accompanying drawings incorporated in and forming part of the specification illustrate several aspects of the present invention. In the drawings.

For the purpose of promoting an understanding of the principles of the invention, reference will now be made in detail to the present preferred embodiments of the invention, examples of which are illustrated in the accompanying drawings. Specific language will be used to describe the same. It will nevertheless be understood that no limitation of the scope of the invention is thereby intended toward such alterations and further modifications in the illustrated device and such further applications of the principles of the invention as illustrated therein as would normally occur to one skilled in the art to which the invention relates.

DETAILED DESCRIPTION OF THE INVENTION

According to the following various embodiments of the invention, there is provided a method and system for converting data in a source database to a target database using an architecture of hardware and software components. In particular, a re-usable database conversion tool and methodology for preparing, performing and/or validating bulk conversions from a source system to a target system is provided.

In one embodiment, the invention comprises a system and method of analyzing a source database and a target database to define a methodology for converting the data in the source database to the target database. This methodology may be defined in mapping instructions/mapping specification using a configurable mapping language provided by the system for interpretation by a database conversion engine. A database conversion engine may comprise a computerized system further comprising computer executable instructions encoded in said computerized system (or served to the computerized system via a network connection) for the receiving/pulling of formatted source data, validation, conversion (including scheduling instructions thereof), and uploading of the source database to the target database.

Figure 1:
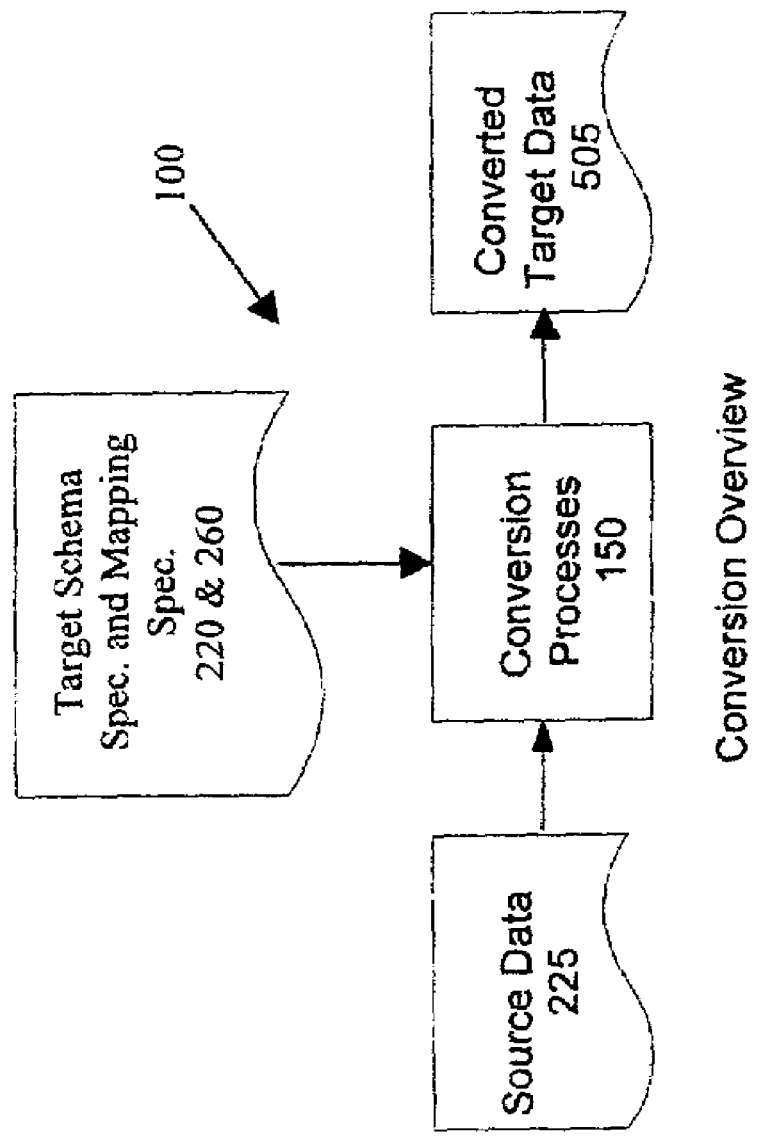
FIG. 1 illustrates an overview of the entire system.
Figure 2:
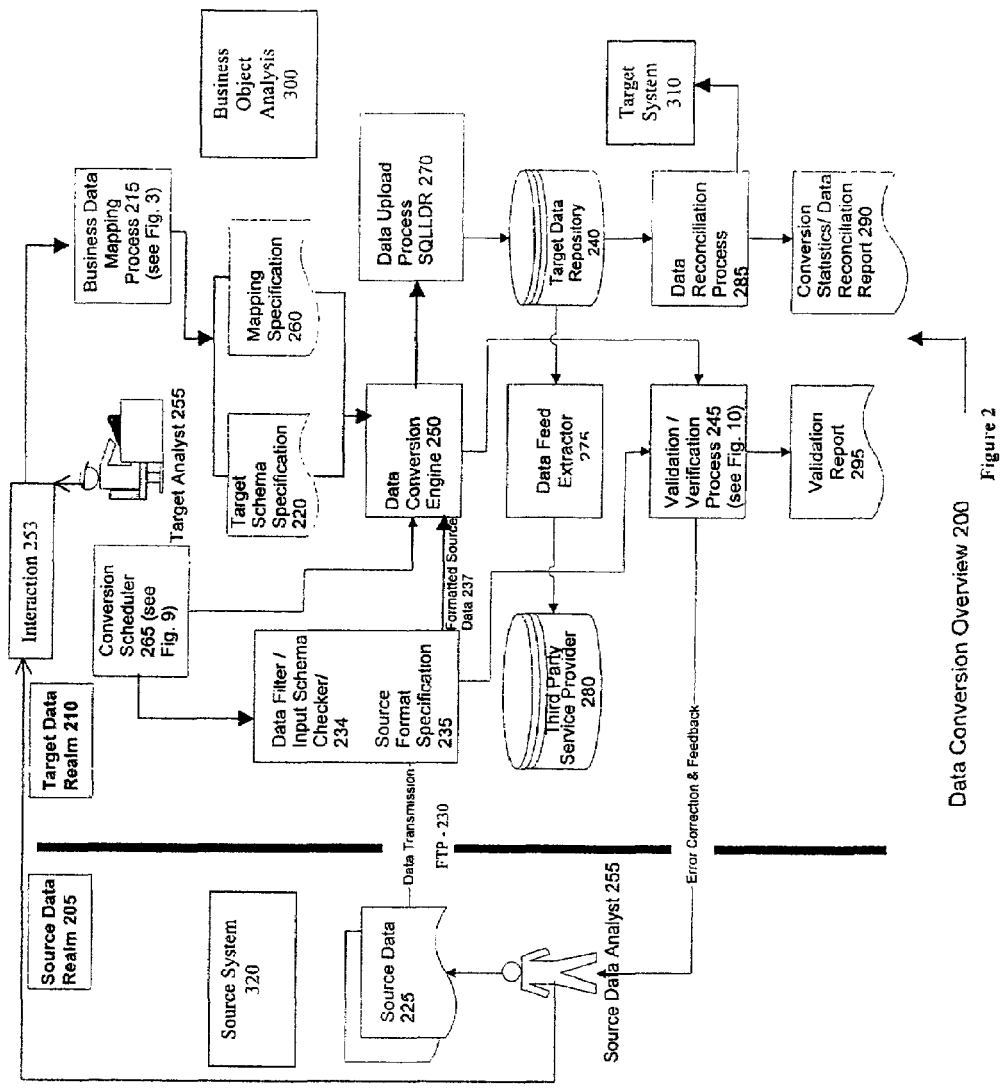
FIG. 2 illustrates one detailed process flow for the conversion from the source data realm to the target data realm.

Referring to FIGS. 1 and 2, once the /mapping specification/mapping instructions (260) have been designed, this mapping specification (260), a target schema specification (220), and the source data (225) are input into the conversion process (150). The source data (225) may have to be formatted according to a predefined format defined by a source extract format/source extract format specification (235) before it may be processed by the database conversion engine (250). The database conversion engine (250) parses the mapping specification (260) and applies these mapping instructions (260) to the source data (225)/formatted source data (237) to produce the target data (505), which may be uploaded into the target system (310) per the specifications outlined by the target schema specification (220). This method flexibly addresses the need for a scalable, customized, holistic database conversion (including special/uncommon data types) as dictated by the specific business needs of each customer within a predetermined amount of time.

Figure 3:
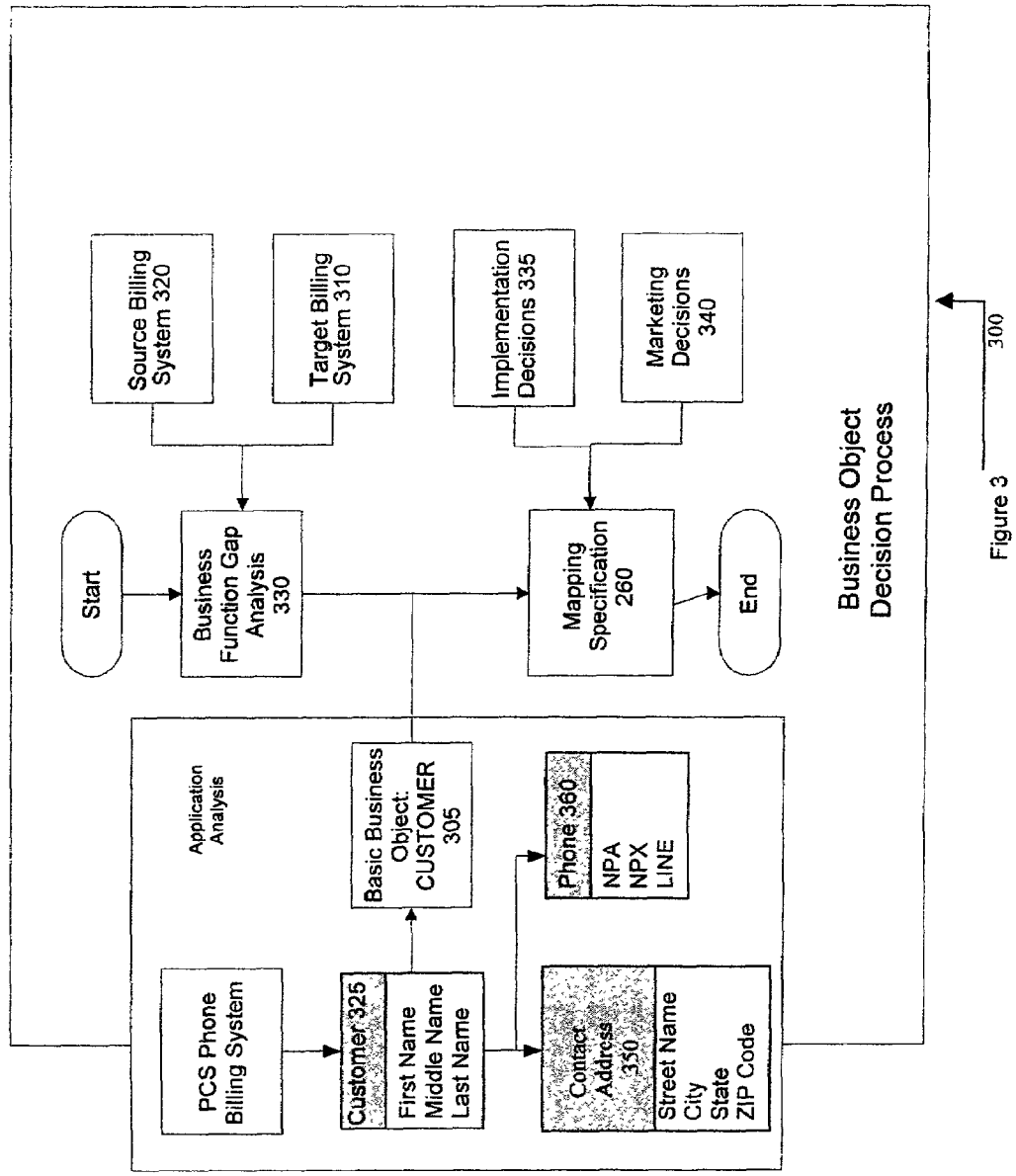
FIG. 3 illustrates an aspect of one embodiment of the process flow, which may result in a basic business object for further developing mapping instructions/mapping specification, target schema specifications, and standard source extract format/source extract format specification for the conversion process.

Referring to FIG. 1, an overview (100) of the system and process is shown. Referring to FIGS. 2–3, another embodiment (200) of the system and methodology is presented. The source data realm (205) and the target data realm (210) generally comprise two independent systems that are used for a similar purpose. The target data realm may, however, accommodate more or less information. The physical location and the two systems may be transparent to the conversion process because various means of transferring source data (230) (and other data) to another location are provided ranging from a simple file copy to employing industry standard file transfer protocols across networks. The source system (320) may be mapped to the target system (310) by determining a basic unit of information (305) (i.e., a customer further comprising a name, phone number, billing address, etc), which encapsulates the information needed by the target system (310) to function. A business object decision process (see, FIG. 3) determines this basic unit of information/business object (305). Then mapping specification (260) may be developed to transfer each basic unit of information contained in the source database (320) to the target database (310) using the system's predefined but configurable mapping language provided by the system. Source data (225), comprising an XML (extensible markup language) file or any type of file capable of being read by the database conversion engine (250), may be formatted according to a standard source extract format specification (235). The formatted source data (237) may further comprise the minimal set of information required to effectively convert the source system (320) to the target system (310). A data filter (234) may be provided to help convert an initial source data (225) file into a final source data format using factors such as the minimal data required, time constraints, and more to do so. Preferably the contents of the source system (320) may be dumped into a flat file and then fed through the data filter (234) to produce an XML file. Thus, the data filter (234) is not limited to a particular technology/system or source database. The data filter (234) may be further configured to generate a particular type of XML formatted data—one that may comply with the source extract format specification (235)

Alternatively the source data (225) may be provided in a form capable of being processed by the database conversion engine (250) directly (i.e., without the use of additional filtering) or the source data (225) may be manually formatted according to the source extract format specification (235). Filters (234), if used, may be programmed to accept a variety of inputs and create a variety of outputs (i.e., text to XML). For instance, the source extract format specification (235) and source data (225) may be fed to the filter (234) and the filter (234) may then render the source data (225) as per the source extract format specification (235) and also ensure that the output complies with standards decreed by type of output chosen (i.e., XML compliance as per the W3C industry standards).

In one embodiment, a data filter (234) will convert source data (225) from the source database (320) from a fixed format to an XML (237). The data filter (234) may be configured to read varying types of input data so that it can meet the needs of multiple projects, each potentially having its own source extract format specifications (235) and input format. Some source systems (320) may present data that may be delimited while some may opt for fixed data format. The data filter (234) may be configured to generate varying schemas of XML output files. The filter (234) may be configurable with the output format parameter so that it will generate an output whose format may be consistent with the specifications. The filter (234) may process voluminous data through burst modes or through streaming mode by using a scalable architecture. The filter (234) may invoke the XML compliance test to ensure that the data meets the W3C specifications. The filter may be configured to group data in batches of files each containing a predetermined volume of source data (225).

Finally, a target schema specification (220), which defines the layout of the target database (310) may be created. The mapping specification (260), target schema specification (220), and the source data (225)/formatted source data (237) may be sent to the database conversion engine (250). The database conversion engine may include a validation process (245, see, FIG. 10), third-party verification of data (245, see, FIG. 10), and/or a conversion scheduler component (265) for scalability purposes. A final upload process (270) may be provided to load the target data (505) into the target database (310).

This methodology flexibly permits the bulk conversion of data from a variety of heterogeneous databases (relational databases, object databases, mainframes etc.) without necessitating code changes in the database conversion engine. Further aspects of this embodiment will be explored in the following pages.

Documentation

The method and system for converting a source database to a target database may involve a highly refined series of documents/protocols for defining the parameters of the conversion. Some of the methodology components used to prepare for the conversion may include: conversion methodology document(s), conversion method analysis document(s), conversion project plan(s), conversion interfaces document(s), conversion usage processing document(s), standard data mapping specification template(s), documentation for a "standard mapping language", standard source extract format specification, conversion validation requirements document(s), conversion validation plan(s), and implementation plan(s).

A "conversion methodology document" may define tasks and deliverables for each project phase.

A "conversion method analysis document" may define information for analyzing and selecting a conversion method.

A "conversion project plan" comprises a standard but configurable schedule of conversion tasks for each conversion. The plan may include information such as assumptions, risks, scope of data to convert, and a project schedule.

A "conversion interfaces document" may address conversion impacts and solutions for standard interfaces such as an IVR and credit card interfaces.

A "conversion usage processing document" may contain information on how usage will be handled prior to, during, and after conversions for converted data.

A "standard data mapping instructions template" may comprise standard templates for mandatory tables and columns required for every conversion within a particular industry, i.e., telecommunications, billing, etc., that can be used as a basis for conversions and customized as necessary. The use of this template minimizes the analysis for future projects for mandatory tables. These templates may comprise computer executable instructions on a computer readable medium.

Documentation for a "standard mapping language" may be provided which outlines the commands which can be used to create the data mapping specification. Some commands may be predefined or even geared to a specific industry, however, the language may also be designed to be extensible and allow the user to define new commands/actions, which may be used in the mapping specification. The standard mapping language, itself, comprises computer executable instructions that may be encoded onto a computer readable medium either directly or via an interface, i.e., a graphical user interface (GUI). The GUI may further facilitate the computerized generation of mapping specification to correspond the conversion choices that are graphically presented and chosen by the user (i.e., the user draws a line on the screen from a source field to a target field and the GUI generates the necessary instruction to effect that conversion). The GUI may be designed to flexibly accommodate new mapping specification without associated code changes. New mapping constructs may be incorporated into the GUI by configuring base commands in the mapping language differently. The GUI may further include a mapping language parser to ensure that any mapping dependency constraints are fulfilled. The GUI may provide a list of available mapping constructs in a selectable list (i.e., a drop down list box). Additional mapping constructs can be easily configured and added to the selectable list by configuring various base commands provided in the mapping language. A given mapping construct may comprise several smaller instructions that are associated with each other. New instructions may be added to the system and to the GUI as needed through an application programming interface (API) provided with the system. The user can implement new functionality, as per the API, and place the new code in a configured directory which can be accessed by both the database conversion engine (250) and the GUI.

A standard "source extract format specification" (235) may be used for conversions. The standard source extract format specification (235) does not require the user to understand the internal database relationships as the standard source extract format specification and conversion utility automatically handle ensuring proper relationships occur. The source extract format specification may be based on business entities and new entities can simply be added as necessary. This standard source extract format specification eliminates the need to define and develop a source extract for every conversion. The standard source extract format specification comprises a specification encoded onto a computer-readable medium that may be processed by a utility encoded with instructions to process such standard source extract format specification.

A "conversion validation requirements document" may comprise requirements for validating critical data for conversions including converted data and data which may be processed after conversion.

A "conversion validation plan" comprises a standard test plan, which contains various information such as the validation strategy, number of iterations, test schedule, etc.

An "implementation plan" comprises additional tasks to be performed during a conversion such as tasks prior to, during, and after the conversion window, backup and restart procedures, etc.

In a preferred embodiment, one or more of these entities may be used to effectively convert one database to another.

Source Extract Format Specification (235)

The source data (225) comprises a file of data that may be preferably in a marked up or delimited format (i.e., XML). Even so, the source data (225) may need to be further formatted according to the specifications provided by a source extract format specification (235) prior to being input into the database conversion engine (250) for conversion. The source extract format specification (235) defines a generic format/ordering of the information in the source data (225). The source data (225) may be converted according to the layout defined by the source extract format specification (235) through the use of data filters (234). The filter may be a configurable component designed to assemble various forms of data into the desired source extract format specification.

If a standard industry source extract format specification is not used for the conversion, one may be generated by analyzing the source and target databases. The quantity and depth of the information to be converted may be ascertained and aggregated (215) into a source extract format specification (235) via a "basic business object" or "unit of conversion" (305). The final formatted source data (237) will comprise repetitive blocks of information comprising this basic business object (305). The source extract format specification (235) may comprise a minimal set of information required to convert the information (225) residing on source system (320) to the target system (310). The source system data (225) may be rendered as per the source extract format specification (235) and transferred (230) to a predetermined location in the target realm (210) for conversion.

The nature of the initial and final data formats are a function of the business requirements and the technical considerations. The business requirements (330) dictate the quantity and depth of the information. The technical considerations include the performance factors and allocated conversion window timeline. A conversion utility/data filter (234) may factor in these considerations to perform optimal data formatting. This embodiment also supports various intermediate data formats that are eventually rendered to a particular final data format (237) for conversion.

Target Schema Specification

The target (310) and source (320) databases may be analyzed (253) by one or more analysts (255), preferably by one set of analysts per data realm, to determine how the information (225) contained in the source database (320) may be converted/transferred/integrated to/with the target database (310). For instance, the source system (320) may be based on one type of unit notation (i.e., meters) while the target system requires (310) another system of unit notation (i.e., feet). The implementation decision (335) refers to conversion implementation (150) where decisions regarding the conversion time-line, the target system downtime, etc., may be ascertained. If the time-line is narrow, then the target schema specification (220) can be streamlined by eliminating details striking a balancing act between system functionality and faster conversions. The marketing decisions (340) pertaining to data conversion (200) involve decision discontinuing certain products, services relevant to the source system (320) and the target system (310). Such decisions impact the quantity and reach of information slated for conversion. In one embodiment the mapping specification (260) and target schema specifications (220) may be designed in a node/tree-like structure. The information may be rolled into a list of individual tables/columns for RDBMS databases or fields/classes for object systems depending upon the nature of source/target system (320/310).

Figure 4A:
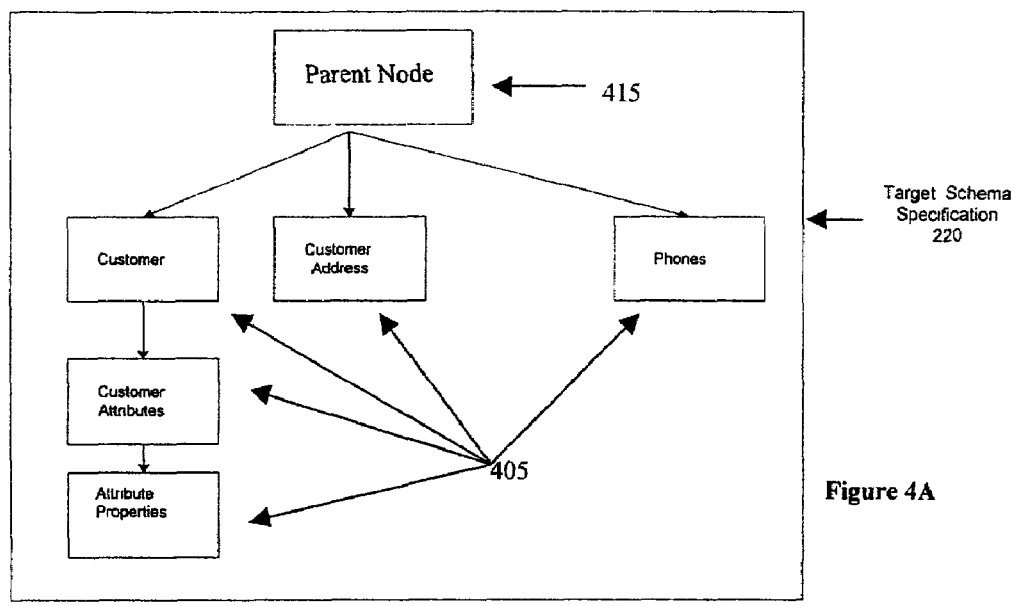
FIGS. 4(A–B) illustrates an aspect of one embodiment of the process flow wherein the mapping instructions/mapping specification and the target schema specification comprise a node structure.

In one embodiment, the target schema specification (220) comprises a machine- readable description of the target system (310). The target schema specification (220) comprises a collection of various pieces of business specific information along with attributes. The attributes include, but are not limited to, non-null data base conditions, field sizes, etc. The target schema specification (220) may provide a thumbprint of the target system (310) to the database conversion engine (250). The mapping information may then be processed according to the specified thumbprint. Referring to FIG. 4A, the target schema specification (220) may comprise a multi-level tree structure and may be traversed on a leaf (405) by leaf (405) basis. The target schema specification does not impose restriction on the number of nodes (405) or on the type of nodes (405). Note that each node corresponds to the table or object or data-dump as the case may be depending upon the target system (310).

Various embodiments of the invention further support a frequent business need wherein a data feed may be necessary for a third party system (to which the target system (310) interfaces) to provide certain business functions. For e.g. telecom-billing systems rely upon a third party vendor (280) to verify customer addresses as/when customers are entered into the system. Such third party vendors (280) require an initial data feed as a part of data conversion efforts (150). The data feed requirements are integrated into the target schema specification (220). The data feed extractor (275) generates data for the third party vendor (280) and packages/ships it to a predetermined location.

This analysis results in the creation of a target schema specification (220) and a mapping specification (260). The target schema specification (220) comprises a marked-up/delimited file, i.e., XML, which contains the requirements, required tables/fields, sizes, attribute specifications, etc., of the target system (210). In one embodiment:

```
< LAND_CD type="string" use="required" length="2" />
< OCCUPATION_INDUSTRY_CD type="number"
    use="optional" length="2" />
```

The first instruction (relating to language-code) stipulates that it is a required field. It further specifies that it is a string with a maximum allowable length of two characters. The second instruction (relating to occupation industry code) specifies that it is a number and its total size is two digits. It also specifies that it is an optional attribute in the target system.

The specifications are grouped with the object/field in the tags. For every table/entity that requires conversion to target system, a group of individual columns/attributes may be converted. The database conversion engine (250) ensures the database field size or the entity size (in case of non-relational systems) conforms to the limit specified.

Like the source extract format specification, the target schema specification more specifically focuses on a basic unit/object of information (305), which comprises a structure for the data to be converted from the source system (320) to the target system (310). The basic unit of information (305) may be decided by employing the business object decision process (300, see, FIG. 3) and determining a basic business object (305). For instance, in the embodiment shown in FIG. 3, a source billing system (320) may be comprised of customers (325) as the basic unit of conversion (305). Every customer (325) in the billing system (320) can have one or more addresses (350) and phone lines (360). Embodiments of this invention are not, however, limited to telecommunications and billing. For instance, if the conversion project pertains to a machine-parts inventory system, the basic unit of such a system may be a "machine-part" qualified with related attributes. It is also worth noting that although the term "object" is part of the term, "basic business object", this does not necessarily mean an "object" in the object-oriented programming sense although this point of reference may work in some cases. The basic business object (305) may also be used to generate the source extract format specification (235).

Creation of the Mapping Specification (260)

The mapping specification (260) creates/maintains the logical relationships between the source database (320) and the target database (310). The mapping process (215) captures all the fields/objects that require translation into the target database (310) and whatever requirements/manipulations may be necessary to effect this into a mapped instruction set/mapping specification (260). The mapped instructions (260) may be interpreted by the database conversion engine (250) for processing. The mapping specification (260) supports operations such as copy a value, value-defaulting, conditional defaults, look-ups, find and replace, resizing, transformations, translations, reference data look-ups, etc. Furthermore, the mapping specification (260) can be extended as and when a specialized and reusable need may be encountered during the mapping phase (215) of the project. Thus, the mapping specification (260) comprises instructions that effect the translation of data from the source system (320) into the target system (310).

The mapping specification (260) isolates the rules relating to the conversion of the source system (320) to the target system (310) from the database conversion engine. The architecture of the system supports this isolation by providing a component with conversion software encoded/loaded/executed on the database conversion engine (which may include any number of servers) that can process these mapping specification. Thus, these instructions may be easily altered for subsequent conversions without modifying the code, which operates the database conversion engine itself.

Part of the development of the mapping specification may include a business functional gap analysis (330) which determines the difference of functionality between the source (320) and target systems (310). The target system (310) usually provides more functionality than the source system (320) and sometimes cannot function without certain critical information. When such critical information may be absent on the source system (320) the data conversion process (200) can generate critically needed information by designing the mapping specification (260) to fill in this data.

Data Conversion Engine Assembly

Figure 5:
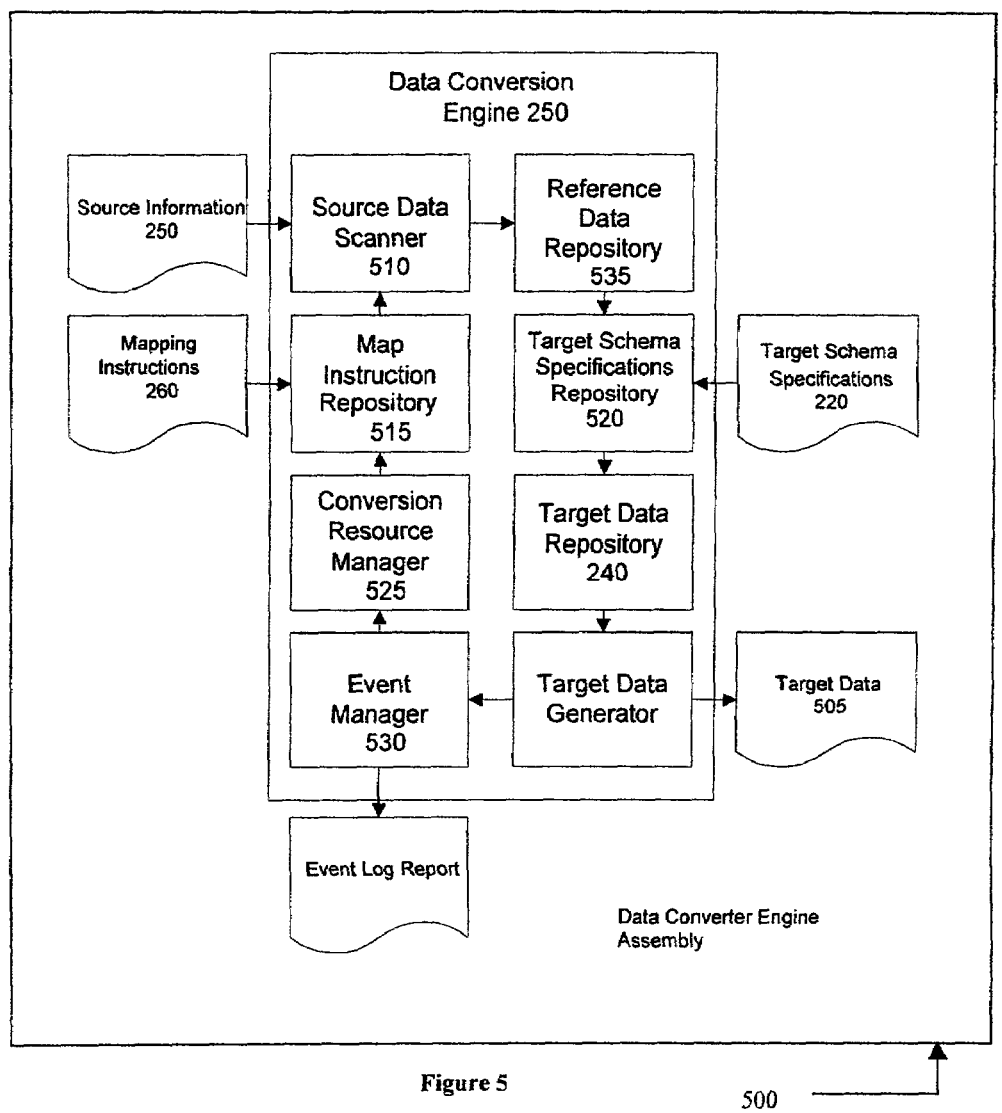
FIG. 5 illustrates one embodiment for the construction of the database conversion engine.

A database conversion engine (250) comprises computer executable instructions on a computer readable medium which process the computer-readable mapping specification (260) on the source data (225) to produce the target data (505). The database conversion engine's code does not have to change for each conversion because the customization for each conversion may be isolated to the mapping specification (260). Referring to FIG. 5, the database conversion engine (250) has a built-in interpreter (525) to process the generic mapping language. In another embodiment, the database conversion engine (250) may be a generic, configurable, scalable, extensible, and/or reusable component whose basic function may be to convert the data (225) using the formatted source data (235), target schema specification (220) and the mapping specification (260) while working in tandem with a scheduler (265), upload process (270) and the validation process (245).

In one embodiment of the invention, a generic database conversion engine (250) may be provided that can process mapping specification (260) configured for various systems/customers/products/releases. The database conversion engine (250) can be configured to generate data in various formats. It can for example, generate data in Oracle's SQLLDR format, HTML format, XML format, etc.

Referring additionally to FIG. 5, an embodiment of the database conversion engine assembly (500) is shown. The database conversion engine's basic function may be to render the source data (225) to target data (505) based upon the supplied mapping specification (260) and target schema specification (220). The database conversion engine may include interface/component support for receiving database records from a particular device and/or may include a data feed for external interface vendors. Interfaces are gateways to supplementary services offered by third-party vendors. Systems may interface to third party systems to gain access to a specialized set of business services. For example, a billing system may have to process payments through multiple mediums (i.e., credit cards, checks, etc.). The capability to process such diverse payments may require extensive hardware and software systems. Furthermore, such payment processing may be outside the business focus of the owner of the billing system. Thus, the services may be delegated to a third party payment services vendor who may establish an interface between the billing system and the third party payment processing system. Such third party systems may require an initial data feed at the time of conversion. The data feed may comprise a list of new customers that are being converted to the newer billing system. One embodiment of the invention provides such data feeds required by third-party systems at the time of conversion.

The database conversion engine (250) may be considered generic because it can serve multiple conversion projects without associated code changes due to the formatted source data, mapping specification, target schema specifications and extendable interfaces and data feeds. The database conversion engine (250) may comprise various modules that work together to perform conversions on the source data (225) fed to it. The source data scanner (510) serves as the source data repository. The source data repository may be designed to work upon predetermined basic units of conversion (305). The instructions in the mapping specification (260) are interpreted and stored in the map instruction repository (515) and are consulted for every basic unit of conversion (305). The target schema information repository (520) serves the target schema specification (220) once for every basic unit of conversion (305).

Figure 6:
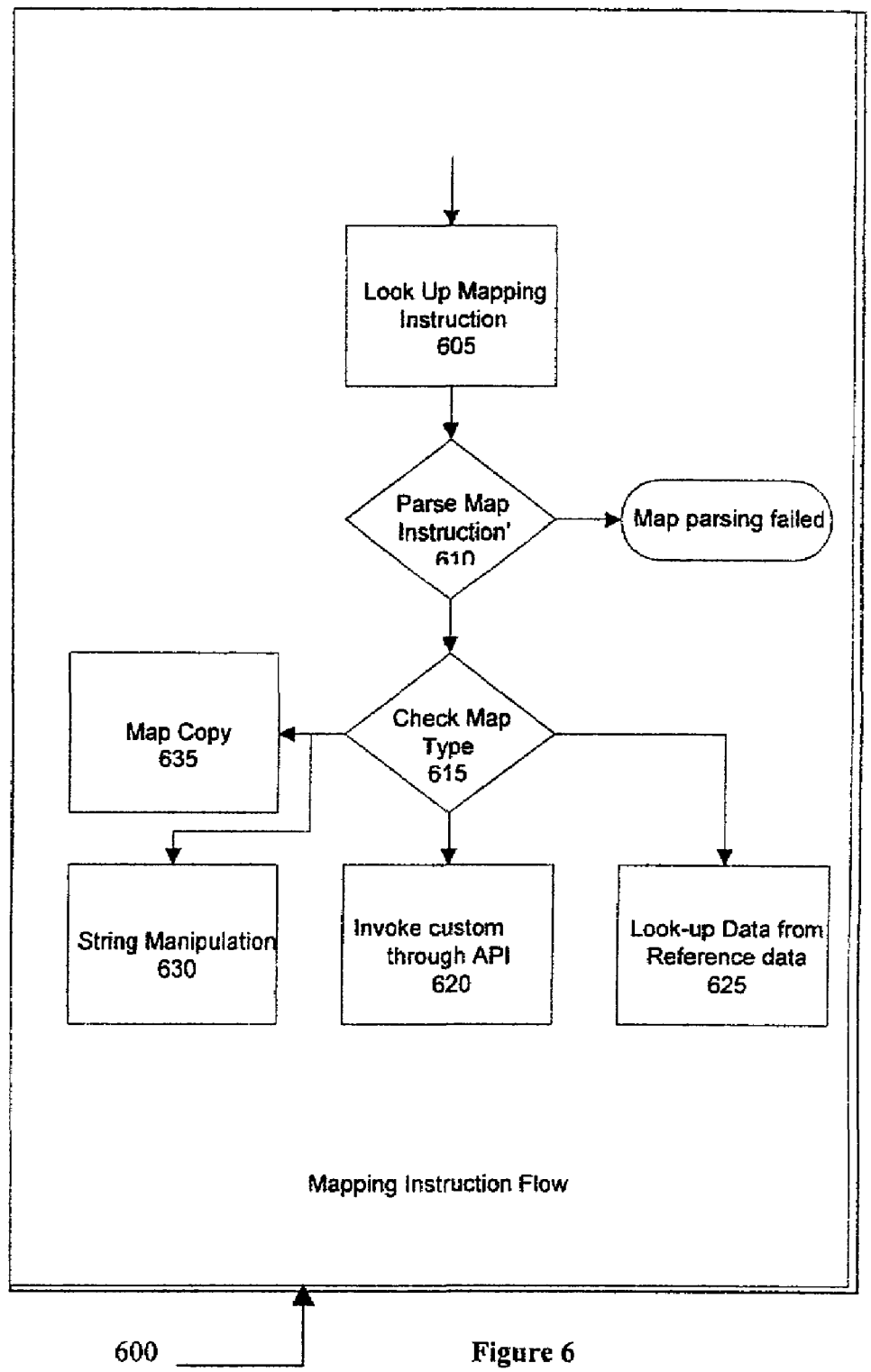
FIG. 6 illustrates a flowchart for one embodiment of the process flow through a mapping instruction.
Figure 7:
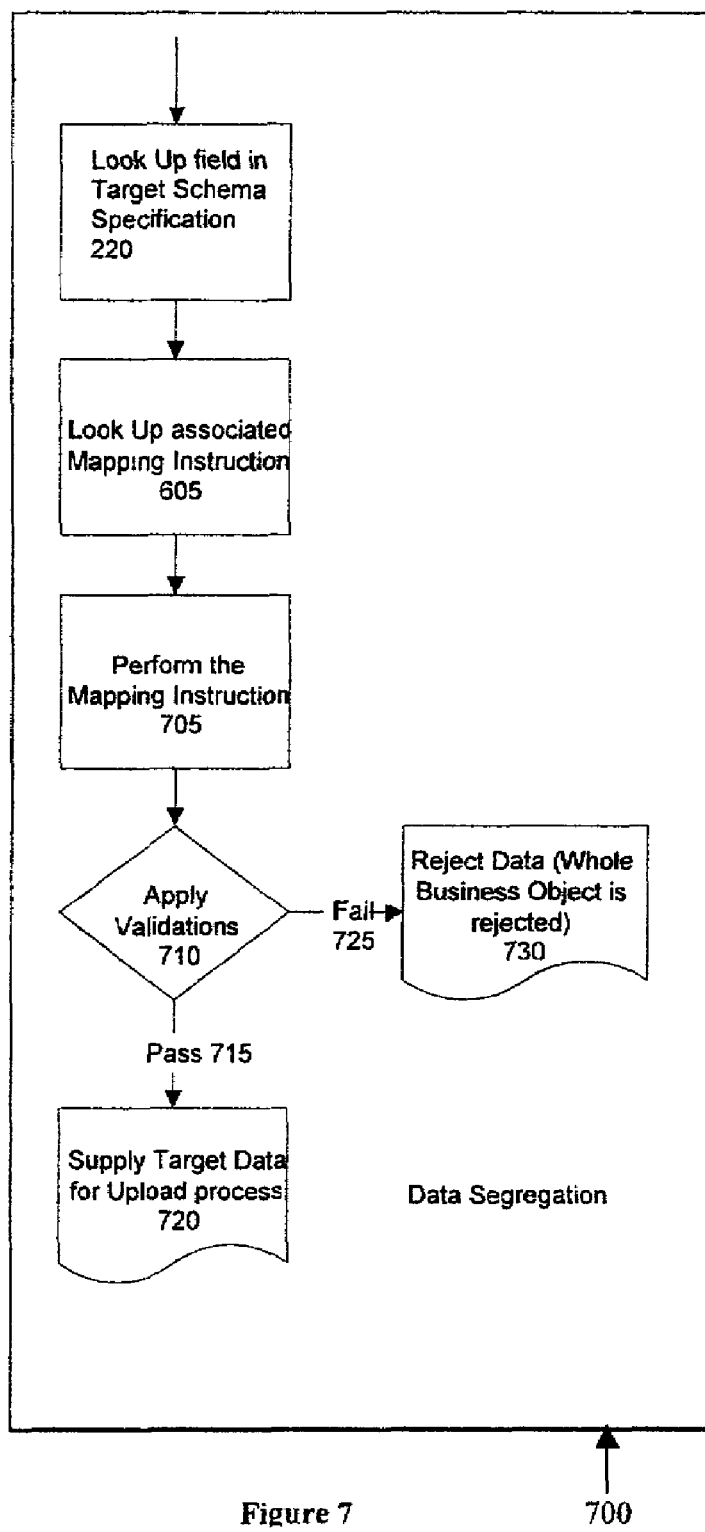
FIG. 7 illustrates one possible interaction flow for the target schema specification and mapping instructions/mapping specification during a conversion.

Referring additionally to FIG. 6, the conversion resource manager (525) manages all the source data (225), third-party reference data (625, which may be stored in the reference data repository (535) and is explained further below) and the target schema specification (220). It may also manage the generation of target data (505) and the associated data formatting process. It may also interpret the automatic generation of implied-data for any source information (225). For e.g. if the source system (320) has certain business information that may be redundantly stored in target schema specification (220) (for purposes of performance, etc.) the conversion manager can automatically duplicate the information and provide a data feed for the redundant objects. Referring additionally to FIG. 7, the validation manager may be consulted for every field and the validity may be ascertained (245/710). When a validity check fails the entire unit of the conversion may be discarded (730). The conversion resource manager (525) may also interpret the mapping specification (260) and take necessary action to convert the data. It tracks resource issues such as memory/disk space etc and logs the exception events though the event manager (530).

A mapping instruction (260) associated with the field may be looked up (605) from the mapping repository (515). The mapping instruction (260) may be parsed (610) and, depending on its type (615), necessary action may be performed. The types of actions include, but are not limited to, string manipulations (630), look- ups, copies (635), defaults etc.

The database conversion engine (250) may additionally include custom data manipulations/scripts (computer executable code encoded on a computer readable medium) that can be implemented using a standard "application programming interface" (API) (620) approach. Most often, information systems require certain business information to be set up much ahead of the target system deployment. This business information may be termed reference data (stored in 535). For example, interest rates for deposit amounts may comprise external reference data. Such information requires a lookup (625) while converting source data (225). This embodiment supports reference information look-up (625) at the time of converting source data (225).

FIG. 7 illustrates one embodiment's database conversion engine process flow between the target schema specification (220), map repository (515) and the validation module (245). For each field that may be required by the target schema specification (220), the associated mapping (515) information may be gotten from the map repository (245). The map instruction may be parsed (610) and may be performed (705). The resultant data from the mapping may be validated (710) using attributes supplied by the target schema specification (220). The basic business units of information (305) that pass (715) the validations will be put into the target data repository (240). The units of information (305) that fail (725) the validations will be erred and segregated for error analysis (730). By operating upon the basic business object (305), this embodiment of the invention is able to convert information more efficiently. This is in opposition to the approach taken by most of products in the market, which focuses upon column-to-column or attribute-to-attribute or object-to-object approach.

The data upload process (270) consists of available tools such as sqlldr from Oracle to custom built tools built per requirements imposed by target system repository/repositories (240). The data upload process (270) may be also scalable and supports voluminous processing of information.

Mapping Language

In one embodiment of the invention, a mapping language may be provided for creating a mapping specification (260) that may be geared toward the specific conversion application (i.e., billing [one billing system to another billing system], non-billing, etc.) and may be easily altered for each client conversion. It is, however, highly extensible in the sense that customized constructs can be added to the language through the extension of abstract classes. The data mapping pertaining to a conversion project may be stored in a file (i.e., a text file). The database conversion engine (250) uses the mapping specification (260) while converting data from source system (320) to target system (310). In another embodiment, the mapping language may be designed to generically address a particular industry such as telecom, billing, etc. The database conversion engine sends the files with the converted data, i.e., flat files, to a target database (310) for loading.

The logical mapping of the source system to the target system may be accomplished through the use of an English-like, user-friendly mark-up/delimited mapping language (i.e., XML or XML-related). A new mapping specification (260) may be written for each conversion. The reusable data processing software (250) interprets the mapping specification (260) that is specific to each client and performs the data conversion for the databases. Preferably, the mapping language may be extensible so that it can accommodate the creation of new instructions. This may be accomplished through polymorphism techniques known in object oriented programming (OOP) and also achievable in other non-OOP languages.

In one embodiment, a typical mapping instruction may have the following hierarchical structure. Information may be embedded between the delimiters <MAP> and </MAP> which pertain to one attribute/column of the conversion. In the example, the entity/attribute/column (all used synonymously) is called DEPT_NAME which is abbreviated for department name in the target system (310).

```
<MAP column_name="DEPT_NAME">
    <TO_SOURCE>SOURCE:CUSTOMER:CUST:DEPT_NAME</TO_SOURCE>
    <ACTION>
        <ACTION_NAME>DEFAULT</ACTION_NAME>
        <ACTION_PARM>NULL</ACTION_PARM>
    </ACTION>
</MAP>
```

The <TO_SOURCE> tag provides information about the location of the data in the incoming source-system data-file. The <ACTION> tag provides information about the nature of the data manipulation such as data translation, transformation, string operations, numerical operations, database lookups, defaulting, copying, database functions/procedures, etc. The supported actions are extensible as necessary for customized requirements. The support for parameters necessary for performing the stated actions is provided as <ACTION_PARM> tag. The language allows multiple actions within each map instruction. This facilitates iterative data rendering to a form acceptable by the target system (310).

```
<MAP column_name="CUSTOMER_SEQUENCE">
    <TO_SOURCE> </TO_SOURCE>
    <ACTION>
        <ACTION_NAME>GENERATE_SEQUENCE</ACTION_NAME>
    </ACTION>
</MAP>
<MAP column_name="CUSTOMER_FIRST_NAME">
```

-continued

```
    <TO_SOURCE> </TO_SOURCE>
    <ACTION>
        <ACTION_NAME>STRING:UPCASE </ACTION_NAME>
    </ACTION>
    <ACTION>
        <ACTION_NAME>STRING:RESIZE</ACTION_NAME>
        <ACTION_PARM>20</ACTION_PARM>
    </ACTION>
</MAP>
```

The above table shows another example map instruction that helps generate a unique sequence number for the attribute CUSTOMER_SEQUENCE. The customer's first name will be converted to upper case (as per target system's requirements) and then the name is resized to 20 characters in length. Note the occurrence of multiple actions per mapping instruction in the above example.

The vocabulary of the mapping language may be extensible. If a new requirement may be deemed reusable then it can be incorporated easily into the database conversion engine (250). A map instruction (260) can be added/deleted without code changes to the database conversion engine (250). A set of instructions for the mapping specification (260) object/table can be grouped by using the object name as the tags. The entire mapping specification (260) may be based upon XML specification.

Figure 4B:
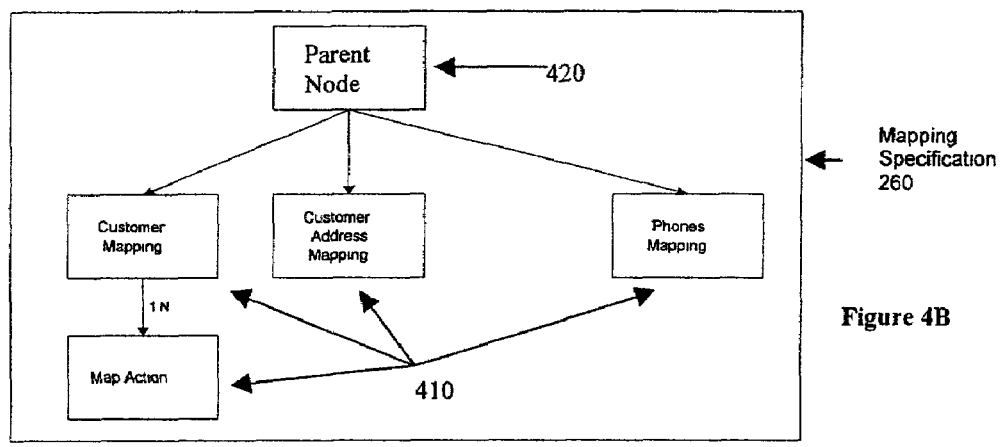

Referring back to FIG. 4B, the mapping specification (260) may also have a tree based structure. The tree-based language may be subsumed and managed as a XML (or XML-derivative) document. The parent node (420) represents the collection of instructions for the entire mapping specification (260). One or more actions can be specified for every field of interest. The invention uses an iterative approach to converting source data (225). A number of actions are applied on the incoming source data in succession there be rendering it to meet the requirements of the target data (505). The tree structure allows the enhancement of the mapping language set. The database conversion engine (250) does not impose direct restrictions on the planned enhancements.

Scalability

Figure 8:
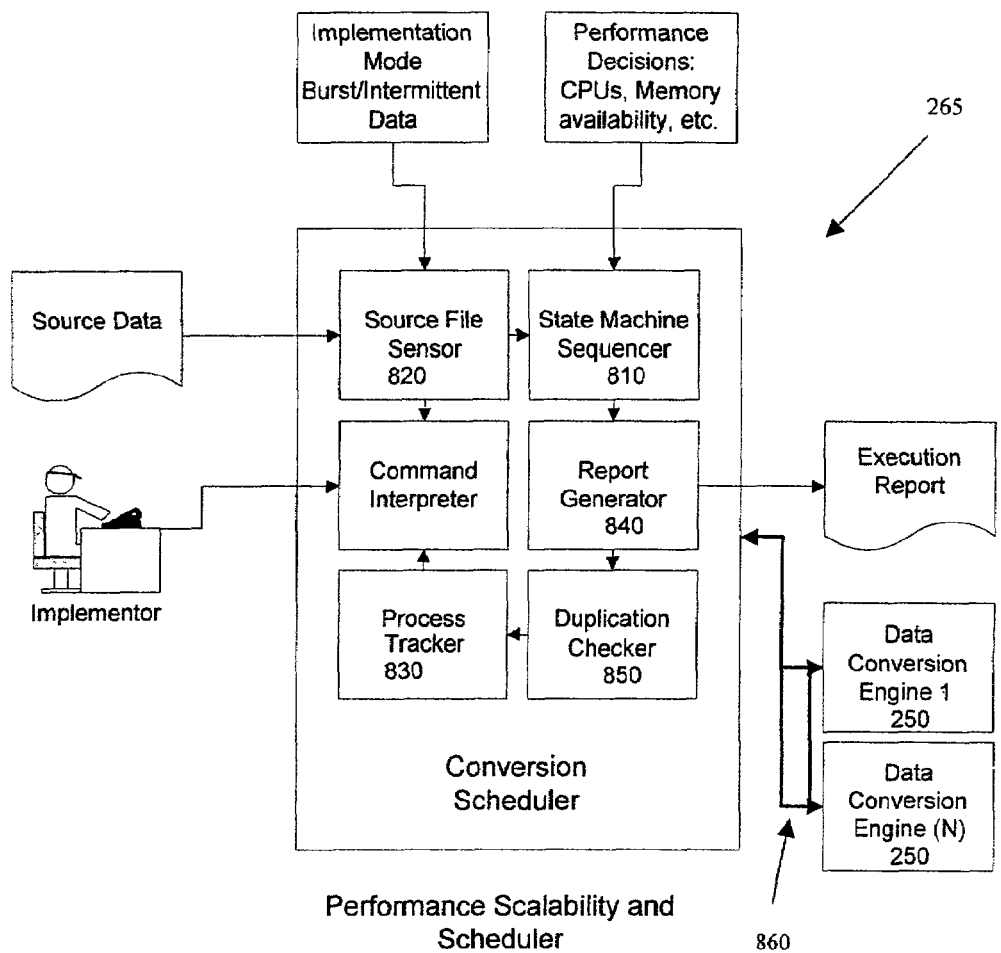
FIG. 8 illustrates a scheduling component that may be used in one embodiment of the invention to increase efficiency.

Preferred embodiments of the invention should provide scalability. Scalability may be achieved by using the conversion scheduler component (265) to alleviate the data conversion bottleneck to manage multi-processing. The conversion scheduler (265) may be configurable to concurrently execute a predetermined number of processes. The number of processes that may be run may be a function of the target system's (310) computing power, memory availability, and the conversion time-line. The more the number of processes, the faster the conversion occurs (up to a resource-defined threshold). The conversion scheduler (265) persistently manages the conversion process from start to finish while monitoring the health of the concurrently running processes. FIG. 8 further illustrates a scaling and scheduling mechanism (265) that may be an aspect of one embodiment of the invention.

The data conversion involves voluminous processing of data that may be converted from source (320) to target system (310) in a small "window" of time to satisfy implementation constraints such as limited system downtime. The scalability may be achieved in two different places. First, a number of conversion instances can be invoked concurrently thereby, exploiting parallelism to improve performance. The number of CPUs and swap memory determines the degree of concurrency. Depending upon the need, the system can be configured to run a particular number of instances or chunks of data stored on a single or multiple source files that contain repetitive blocks of data comprising business objects (305). A number of factors for fine-tuning performance, file locations, validation results can be configured for the database conversion engine (250) through a configuration file, i.e. an XML configuration file. Secondly, the converted data may be uploaded (270) to a database (240) employing a mass-update approach that may be run with multiple instances to gain performance. There may be an error checking and reporting feature that tracks the multiple instances of the database conversion engine (250).

Embodiments of the invention permit at least two modes of operation—streaming and burst. The streaming mode streams source data when the source system makes it available for conversion. The burst mode allows the system to process the conversion (150) via predetermined quantities of source data (225). The nature of the business function performed by the source (320) and target systems (310) may dictate the type of mode employed for conversion.

The scheduler process (265) utilizes a state machine sequencer (810) with programmable sequences depending upon the requirements. It scans for the incoming source information (820) and may initiate the execution of the data conversion process. The degree of concurrency may be decided by number of CPUs, memory and the type of CPUs and may be a decided at the time of implementation and configured into the process. The state machine sequencer (810) takes the source information through the various conversion processes until it meets the target system's (310) specifications. Once the conversion processes are initiated, the process tracker (830) monitors them for completion. The results of the tracking are published through a report for end-user by the report generator module (840). The system enforces prevention of duplicative processing of data in the source files (850). To achieve greater performance, the system may be constructed to be capable of distributed processing, which utilizes a networked set of machines (860) to process information.

Validation

Figure 9:
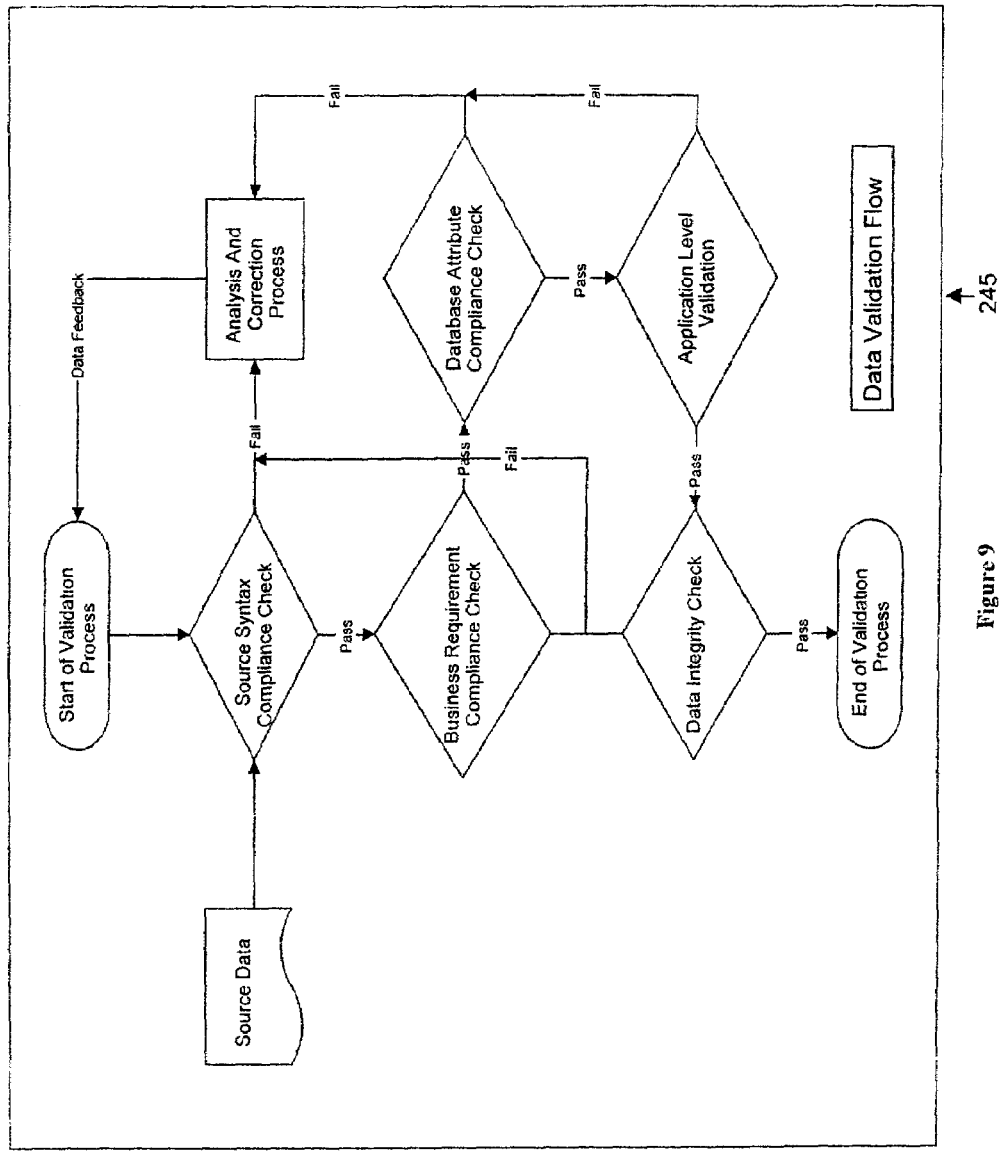
FIG. 9 illustrates a process flow for the validation process embodied in the conversion engine of one embodiment of the invention.

Referring to FIG. 9, another embodiment of the invention supports an extensive validation process (245). The validation process may be extensible, configurable, and reconcilable in its architectural design. Validation may include up to five or more stages of data and application level validation. Validation may be applied to the basic unit of conversion and hence provides a mechanism to segregate invalid information from entering the target system (310). It supports a template generator to generate custom application level validations. A validation report (295) may be generated. A reconciliation process (285) may be provided to ensure the accuracy of the conversion process. A reconciliation report (290) provides statistics on the various units of information that can be checked with the source system. Various embodiments further support an error detection and a guided correction process. Corrected data can be seamlessly/automatically reprocessed and incorporated into the target system (310). For instance, a "conversion validation script" comprises a standard scripts (computer code/computer executable instructions on a computer readable medium) which may be run to perform key application validations for a given systems (i.e., telecom) such as ensuring no active subscriptions exists for a deactivated account.

The validation process (240) and the database conversion engine (250) may use the target schema specification (220) for verifying target information before uploading (270) such information to the target database (310).

The design of the validation process (245) permits future additions of validation rules. Application specific validation (including but not limited to address validation and calculation of geocodes, possibly using a third party database) can be incorporated into the framework.

In another embodiment, the validation levels may correspond to the criticality of the information being validated. For example, the customer address may be critical in the case of a billing system. Therefore, a first level of validation may comprise checking for syntax errors in the formatted source data (i.e., XML syntax errors) that highlight non-compliance such as the improper tagging of data in the delimited file. The second level of validation may ensure that critical business information may be supplied by the source system for each basic unit of conversion by checking for missing blocks of information that are required by the target system in order to function. A third level of validation ensures that the pieces of information meet the target schema specifications by checking for issues such as mandatory data within a business object, invalid data lengths/not null restrictions, font requirements, etc. that might prevent a database load. For example, absence of a customer's credit class code might result in validation failure at this stage. In the event that certain errors are detected, the whole unit of conversion may be put into a separate data bucket for a correction and feed back process. The fourth level of validation may be the application level validation. These are highly application specific in nature. The system may provide a generic template generator for application level validations. The validation framework automatically invokes and reports on validation problems identified by the template. A final level of validation may check the data integrity from viewpoint of business. It checks the uniqueness constraints, referential constraints, etc in this stage. This level of validation may also reference third party databases to verify certain information present in the basic business object such as the customer's address. The fallout from the validation process may be guided through a correction process. Certain problems are fixable by reprocessing of corrected information while some of them are fixable through customized approaches.

Modifications may be made in the various embodiments of the invention without departing from the spirit of the invention.

What is claimed:

1. A computer system for migrating a source database wherein a specific type of source database is selected from a relational database, an object-oriented database, or a network database, to a target database comprising:
   a set of mapping instructions;
   a target schema specification; and
   a generically coded database conversion engine wherein the database conversion engine is coded to perform conversions independent of the specific type of source database and the specific type of target database associated with a conversion; wherein:

data in the source database is sent to the database conversion engine;

the target schema specification defines the target database;

the set of mapping instructions defines at least one translation instruction for the translation of the source data from the source database to the target database;

the database conversion engine receives the source data, the set of mapping instructions and the target schema specification;

the database conversion engine parses the set of mapping instructions and the target schema specification;

the database conversion engine performs the set of mapping instructions on the source data;

the database conversion engine uploads a resulting set of data into the target database in accordance with the target schema specification; and the database conversion engine validates the source data and the resulting set of data in accordance with the target schema specification.

2. A computer system for migrating a source database to a target database as claimed in claim 1 further comprising:
a delimited source file associated with said source database;
a mapping language;
wherein:
a set of data in said delimited source file is sent to a database conversion engine;
a set of mapping instructions is developed from said mapping language wherein said set of mapping instructions defines at least one translation instruction for the translation of said source data from the source database to the target database.

3. A computer system for migrating a source database to a target database as claimed in claim 2 further comprising:
a set of mapping instructions;
wherein:
a set of mapping instructions is developed from said mapping language via an interface wherein said set of mapping instructions defines at least one translation instruction for the translation of said source data from the source database to the target database.

4. A computer system for migrating a source database to a target database as claimed in claim 2 further comprising:
a set of mapping instructions;
wherein:
a set of mapping instructions is developed from said extensible mapping language via an interface wherein said set of mapping instructions defines at least one translation instruction for the translation of said formatted source data from the source database to the target database.

5. A computer system for migrating a source database to a target database as claimed in claim 2 further comprising:
an industry-specific mapping instructions template;
wherein:
a set of mapping instructions is developed from said industry-specific mapping instruction template and is further configured using said mapping language via a graphical user interface wherein said set of mapping instructions defines at least one translation instruction for the translation of said formatted source data from the source database to the target database.

6. A computer system for migrating a source database to a target database as claimed in claim 2 further comprising:
a telecommunications-specific mapping instructions template;
wherein:
a set of mapping instructions is developed from said telecommunications-specific mapping instruction template and is further configured using said mapping language via a graphical user interface wherein said set of mapping instructions defines at least one translation instruction for the translation of said formatted source data from the source database to the target database.

7. A computer system for migrating a source database to a target database as claimed in claim 2 further comprising:
a billing-specific mapping instructions template;
wherein:
a set of mapping instructions is developed from said billing-specific mapping instruction template and is further configured using said mapping language via a graphical user interface wherein said set of mapping instructions defines at least one translation instruction for the translation of said formatted source data from the source database to the target database.

8. A computer system for migrating a source database to a target database as claimed in claim 5 wherein said database conversion engine parses said set of mapping instructions and concurrently performs said set of mapping instructions on said formatted source data to produce a resulting set of data.

9. A computer system for migrating a source database to a target database as claimed in claim 8 further comprising:
a source extract format specification;
wherein:
a basic business object is derived from said source database and said target database;
said source extract format specification and said target schema specification are configured according to said basic business object;
data in said source database is formatted according to said source extract format specification to produce a file with repetitive instances of said basic business object (formatted source data);
said database conversion engine parses said set of mapping instructions and concurrently performs said set of mapping instructions on said formatted source data and uploads a resulting set of data into said target database.

10. A computer system for migrating a source database wherein a specific type of source database is selected from a relational database, an object-oriented database, or a network database, to a target database comprising:
a set of mapping instructions;
a source extract format specification;
a target schema specification; and
a generically coded database conversion engine wherein the database conversion engine is coded to perform conversions independent of the specific type of source database and the specific type of target database associated with a conversion;
wherein:
a basic business object is derived by analyzing information to be transferred from the source database to the target database;
the source extract format specification and the target schema specification are configured according to the basic business object;
data in the source database is sent to the database conversion engine;

the target schema specification defines the target database;

the set of mapping instructions defines at least one translation instruction for the translation of the source data from the source database to the target database;

data in the source database is formatted according to the source extract format specification to produce a file with repetitive instances of the basic business object (formatted source data);

the database conversion engine receives the source data, the set of mapping instructions and the target schema specification;

the database conversion engine parses the set of mapping instructions and the target schema specification;

the database conversion engine performs the set of mapping instructions on the source data;

the database conversion engine uploads a resulting set of data into the target database in accordance with the target schema specification; and the database conversion engine validates the source data and the resulting set of data in accordance with the target schema specification.

11. A computer system for migrating a source database wherein a specific type of source database is selected from a relational database, an object-oriented database, or a network database, to a target database comprising:

a mapping specification;
a data filter;
a source extract format specification;
a target schema specification; and
a generically coded database conversion engine wherein the database conversion engine is coded to perform conversions independent of the specific type of source database and the specific type of target database associated with a conversion;

wherein:

the database conversion engine receives the formatted source data;

the database conversion engine converts the formatted source data according to the mapping specification (converted data);

the database conversion engine formats the converted data in accordance with the target schema specification (target data);

the database conversion engine uploads the target data into the target database; and the database conversion engine validates the source data and the resulting set of data in accordance with the target schema specification.

12. A computerized method for migrating a source database wherein a specific type of source database is selected from a relational database, an object-oriented database, or a network database, to a target database comprising:

a delimited source file associated with the source database;

a source extract format specification;
a set of mapping instructions;
an industry-specific mapping instructions template;
a mapping language;
a target schema specification; and
a generically coded database conversion engine wherein the database conversion engine is coded to perform conversions independent of the specific type of source database and the specific type of target database associated with a conversion, and further comprising the steps of:

formatting the delimited source file according to the source extract format specification (formatted source data);

defining a set of requirements for the target database and encoding the requirements in the target schema specification;

developing a set of mapping instructions, that define at least one translation instruction for the translation of the formatted source data from the source database to the target database, using the industry-specific mapping instruction template and further configuring the mapping instructions with commands developed with the mapping language via a graphical user interface;

sending the formatted source data, the set of mapping instructions and the target schema specification to the database conversion engine;

validating the formatted source data through a set of computer executable instructions encoded in the database conversion engine;

parsing the set of mapping instructions;

concurrently performing the set of mapping instructions on the formatted source data to produce a resulting set of data;

validating the resulting set of data by comparing it to the target schema specification through a set of computer executable instructions encoded in the database conversion engine; and uploading the resulting set of data into the target database.

13. A computerized method for migrating a source database to a target database as claimed in claim 12 further comprising the steps of:

defining at least one basic business object for said migration by analyzing said source database and said target database;

configuring said source extract format specification and said target schema specification according to said basic business object;

formatting data in said source database according to said source extract format specification to produce a file with repetitive instances of said at least one basic business object (formatted source data).

* * * * *

UNITED STATES PATENT AND TRADEMARK OFFICE
CERTIFICATE OF CORRECTION

PATENT NO. : 6,996,589 B1 Page 1 of 1
APPLICATION NO. : 10/050273
DATED : February 7, 2006
INVENTOR(S) : Nandagopal et al.

It is certified that error appears in the above-identified patent and that said Letters Patent is hereby corrected as shown below:

At Column 11, line 36, immediately after the word "information", please insert --(305)--.

At Column 23, Claim 2, line 9, please delete, "a set of..." and insert, --said set of...--

At Column 23, Claim 3, line 3, please delete, "a set of..." and insert, --said set of...--

At Column 23, Claim 3, line 5, please delete, "a set of..." and insert, --said set of...--

At Column 23, Claim 4, line 3, please delete, "a set of..." and insert, --said set of...--

At Column 23, Claim 4, line 5, please delete, "a set of..." and insert, --said set of...--

At Column 23, Claim 4, line 5, please delete, "...said extensible" and insert, --...an extensible--

At Column 23, Claim 5, line 5, please delete, "a set of..." and insert, --said set of...--

At Column 24, Claim 6, line 4, please delete, "a set of..." and insert, --said set of...--

At Column 24, Claim 7, line 5, please delete, "a set of..." and insert, --said set of...--

Signed and Sealed this

Second Day of October, 2007

JON W. DUDAS
*Director of the United States Patent and Trademark Office*